(12) United States Patent
Riemers

(10) Patent No.: US 10,684,889 B2
(45) Date of Patent: Jun. 16, 2020

(54) SYSTEMS, METHODS, AND COMPUTER PROGRAM PRODUCTS FOR SCHEDULING PROCESSING JOBS TO RUN IN A COMPUTER SYSTEM

(71) Applicant: Red Hat, Inc., Raleigh, NC (US)

(72) Inventor: Bill Clifford Riemers, Stoney Creek (CA)

(73) Assignee: Red Hat, Inc., Raleigh, NC (US)

( * ) Notice: Subject to any disclaimer, the term of this patent is extended or adjusted under 35 U.S.C. 154(b) by 364 days.

(21) Appl. No.: 13/756,118

(22) Filed: Jan. 31, 2013

(65) Prior Publication Data

US 2014/0215479 A1    Jul. 31, 2014

(51) Int. Cl.
*G06F 9/48* (2006.01)

(52) U.S. Cl.
CPC .................. *G06F 9/4881* (2013.01)

(58) Field of Classification Search
USPC .................................. 718/100, 101
See application file for complete search history.

(56) References Cited

U.S. PATENT DOCUMENTS

| 7,086,062 | B1 * | 8/2006 | Faour et al. ................. 718/106 |
| 8,271,355 | B2 | 9/2012 | Johnson et al. |
| 2005/0268299 | A1 * | 12/2005 | Picinich ................. G06F 9/485 718/100 |
| 2006/0020942 | A1 * | 1/2006 | Ly et al. ................. 718/100 |
| 2007/0231816 | A1 * | 10/2007 | Chaussabel .......... C12Q 1/6883 435/6.12 |
| 2008/0016508 | A1 * | 1/2008 | Goto ..................... G06F 9/5088 718/102 |
| 2008/0229330 | A1 * | 9/2008 | Hambrick et al. ............ 719/315 |
| 2010/0153952 | A1 * | 6/2010 | Linder ........................ 718/101 |
| 2012/0204180 | A1 * | 8/2012 | Santoli et al. ................ 718/101 |
| 2012/0311586 | A1 * | 12/2012 | Inagaki ................. G06F 9/4881 718/100 |
| 2013/0013532 | A1 | 1/2013 | Loucaides et al. |
| 2013/0013577 | A1 | 1/2013 | Fee et al. |

FOREIGN PATENT DOCUMENTS

WO    WO 2005/089241    9/2005

* cited by examiner

*Primary Examiner* — Wynuel S Aquino
(74) *Attorney, Agent, or Firm* — Haynes and Boone, LLP

(57) ABSTRACT

A method includes, in a program that includes a defined number of job slots for data updating processing jobs, scheduling a first job in one of the slots, and executing the first job, wherein the first job includes scanning a list of additional jobs and scheduling those additional jobs for execution, further wherein a total number of the additional jobs in the program exceeds the defined number of job slots.

20 Claims, 3 Drawing Sheets

SYSTEMS, METHODS, AND COMPUTER PROGRAM PRODUCTS FOR SCHEDULING PROCESSING JOBS TO RUN IN A COMPUTER SYSTEM

BACKGROUND

Technical Field

The present disclosure generally relates scheduling processing jobs to run in a computer system and, more specifically, to scheduling jobs to run when the computer system has a limited number of job slots.

Related Art

Processing jobs may include any of a variety of actions performed by a computer system. In one example, a computer system runs a platform that provides Customer Relationship Management (CRM) services to end users. The CRM platform may include data updates that take the form of scheduled processing jobs. For instance, when a salesperson creates an opportunity entry in the system but then does not update the opportunity entry for several days, the CRM platform may automatically move the opportunity entry to a queue for another salesperson. The movement of the opportunity entry from one work queue to another is a type of data update that may be handled as a scheduled processing job.

An example of a CRM platform is Sales Cloud™, available from salesforce.com, Inc. Of course, the above-described example is not limiting, as scheduled processing jobs may include other types of data updates and may be performed by computer systems running platforms other than CRM platforms.

Some platforms run by computer systems may be limited in a number of available slots in which to schedule processing jobs. Furthermore, a particular platform may be limited in the number of jobs that can be run concurrently.

BRIEF SUMMARY

Figure 1:
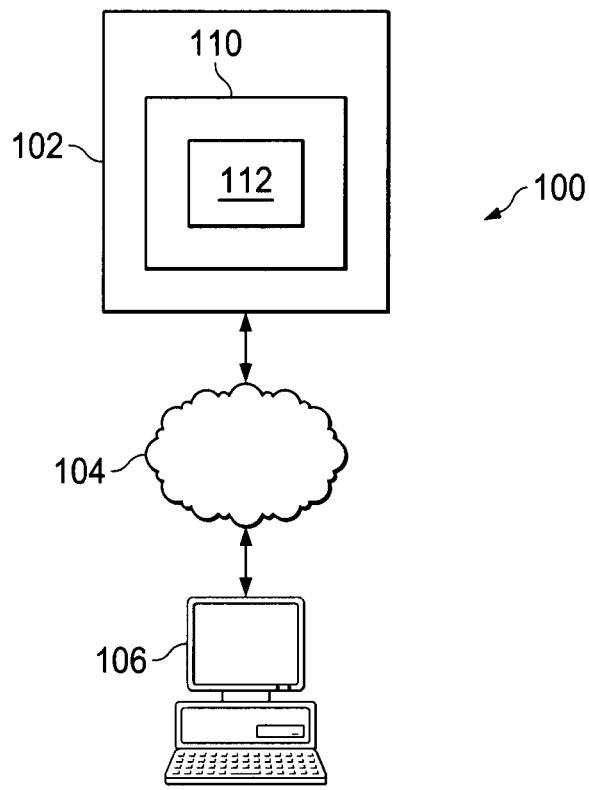
FIG. 1 is an illustration of an example computer system, adapted according to one embodiment.

According to one embodiment, A method includes, in a program that includes a defined number of job slots for data updating processing jobs, scheduling a first job in one of the slots, and executing the first job, wherein the first job includes scanning a list of additional jobs and scheduling those additional jobs for execution, further wherein a total number of the additional jobs in the program exceeds the defined number of job slots.

According to another embodiment, a system includes one or more server computers serving one or more end-user computers, the server computers running a program that provides data updating jobs and has a limited number of available slots for a set of scheduled data updating jobs, the server further executing code to provide: job scheduling logic that is associated with one or more of the slots, the job scheduling logic accessing a list of additional jobs not associated with the slots, instantiating objects associated with the additional jobs, and scheduling the additional jobs in accordance with respective frequency and priority values of each of the additional jobs.

According to yet another embodiment, a computer program product having a computer readable medium tangibly recording computer program logic for updating data in a computer system, the program logic including a defined number of data processing job slots, the computer program product including: code to schedule a first job in one of the slots, the first job including a scheduling function that scans a first list for class names scheduled to run, code to select ones of the class names scheduled to run based on the scanning, code to create a plurality of task objects, at least one task object for each selected class name, code to use triggers to create a monitoring object for a respective class name for each of the task objects, code to create a plurality of instances, at least one instance for each of the selected class names, and to inject the instances into a second list, and code to schedule additional jobs by the scheduling function, each of the additional jobs corresponding to a respective one of the instances in the second list.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

According to the various aspects of the present disclosure, a method, system, and computer program product are discussed below that allow for scheduling processing jobs in a platform in which the number of available job slots and the number of concurrent processing resources is limited. Furthermore, various aspects of the disclosure provide for techniques to monitor scheduling and performance of processing jobs and to send alerts when appropriate.

Various examples described below implement a technique of scheduling processing jobs in a computer system, whether the computer system runs a CRM platform or other program. In one illustrative example the platform includes a limit of twenty processing jobs that can be scheduled each hour. Thus, a single job that is scheduled to run every five minutes, thereby running twelve times per hour, uses twelve out of the twenty slots. Accordingly, the twenty available slots may be filled quite quickly by repeating jobs.

Various embodiments cope with the limited number of job slots by using one or more of the job slots for a job that accesses a list of additional classes. For instance, twelve of the job slots may be used to create a job that recurs every five minutes, where the recurring job includes a scheduler that scans the list to determine if any of the classes are indicated as coming due to run. For those classes that are coming due to run, the computer system creates instances of the classes and places references to the instances into a map or list object. In this example, each of the class instances is a processing job that is in addition to any other processing jobs that may be assigned to the remaining slots. The scheduler then schedules the jobs from the instances in the map object.

The computer system then executes the jobs as the jobs are scheduled. Thus, while the platform itself may only have a limited number of slots (e.g., twenty), the technique described above can be used to expand the number of schedulable processing jobs beyond the number of slots. Some example platforms may include a limit to the number of processing jobs that may be executed concurrently, e.g., five jobs. Some embodiments may allow for priorities to be applied to the jobs that are instantiated from the map so that jobs with a higher priority may be executed first within the constraints of the system.

Further in some examples, for each of the classes in the list, the scheduler creates a task object to be placed in a user's calendar and a monitoring object. The task object can be dated in the future, e.g., a day from when its corresponding job is set to run. If the system later detects that the task is overdue, the system can assume that the corresponding job has not been run within the previous day. The monitoring object reflects information for its corresponding job. A time-based function can be used to check the monitoring object at a set time and to report any errors. Examples of errors include a failure of a job to be scheduled and a failure of a scheduled job to be executed. In the case of errors, alert messages may be sent to one or more human users. For instance, an end-user and/or an Information Technology (IT) staff member may be alerted by email, text message or other appropriate medium.

Various embodiments may be adapted for a variety of systems. In one example, the functionality described above may be implemented in an application that can be used to supplement and customize a cloud-based CRM platform and run on servers that provide the CRM platform. FIG. 1 is an illustration of example system 100 adapted according to one embodiment. System 100 includes cloud-based resources 102, which may include one or more physical processor-based devices. In some examples, cloud-based resources 102 include virtual computing resources, which may be spread among two or more server computers at any given time. System 100 includes client computer 106, which accesses the cloud-based resources 102 and interfaces with an end-user or IT professional. Computer 106 communicates with cloud-based resources 102 over network 104, where network 104 may include the Internet, a Wide Area Network (WAN), a Local Area Network (LAN), a cellular network, and/or other appropriate networks.

Cloud-based resources 106 execute computer code to provide the functionality of CRM platform 110. CRM platform 110 has a software application 112 that supplements and customizes the functionality of CRM platform 110. For instance, the functionality described herein in which additional jobs are scheduled from a table with classes may be added via application 112. However, in other embodiments, the functionality may be included within CRM platform 110.

In another example, the functionality can be implemented in an enterprise-level program on a company intranet. In yet another example, the functionality can be implemented on a computer, whether connected to a network or not. In fact, the principles described in the present disclosure may be adapted for use in a software program or platform, whether directed to CRM or otherwise, and may be run on any type of computer (e.g., a server, a laptop, a tablet, smartphone, and/or the like).

Figure 2:
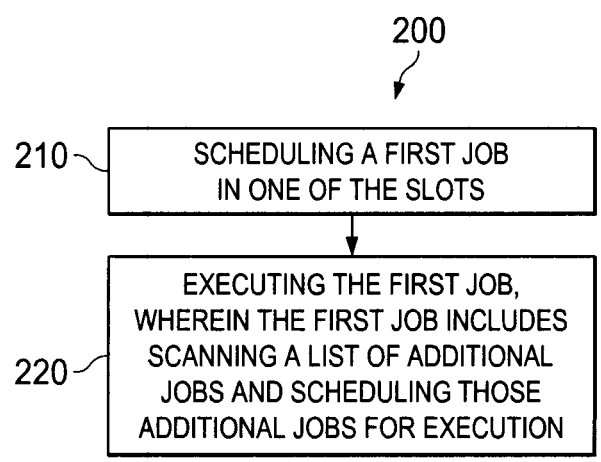
FIG. 2 is an illustration of an example process, adapted according to one embodiment.

FIG. 2 is an illustration of method 200, adapted according to one embodiment, to schedule processing jobs in a computer system according to the examples above. The actions of FIG. 2 may be performed by one or more applications running on one or more processor-based devices to implement the processing job scheduling and processing job execution. In some embodiments, the various actions are carried out by one or more computer processors executing computer code to provide the described functionality. Method 200 is performed in a program that includes a defined number of job slots.

In action 210, the system schedules a first job in one of the job slots. For instance, in the CRM platform called Sales Cloud™, there is a job called DailyScheduler that may be scheduled in one or more of the slots. In this example, DailyScheduler is a function that itself is operable to instantiate classes and schedule those instantiations. Thus, some embodiments include DailyScheduler in as many of the slots as appropriate. For instance, if it is desired to run Daily-Scheduler every five minutes, DailyScheduler may be included in twelve of the slots. While DailyScheduler is one example of a job that can be used in method 200, the scope of embodiments not limited to being applied to Sales Cloud™ or to any other particular program.

In action 220, the system executes the first job. Executing the first job includes scanning a list of additional jobs and scheduling those additional jobs for execution. Further in this example, the total number of additional jobs plus other scheduled jobs exceeds the defined number of job slots. For instance, in a scenario in which the total number of job slots is limited to twenty, the list of additional jobs may be large enough so that when its jobs are scheduled, the total number of scheduled jobs may be larger than twenty. In fact, the total number of jobs that may be scheduled is not limited by a number of job slots, but instead may be constrained by other issues, such as available processing power, a limit on a number of concurrent jobs, length of time to complete a given job, and the like.

Figure 3:
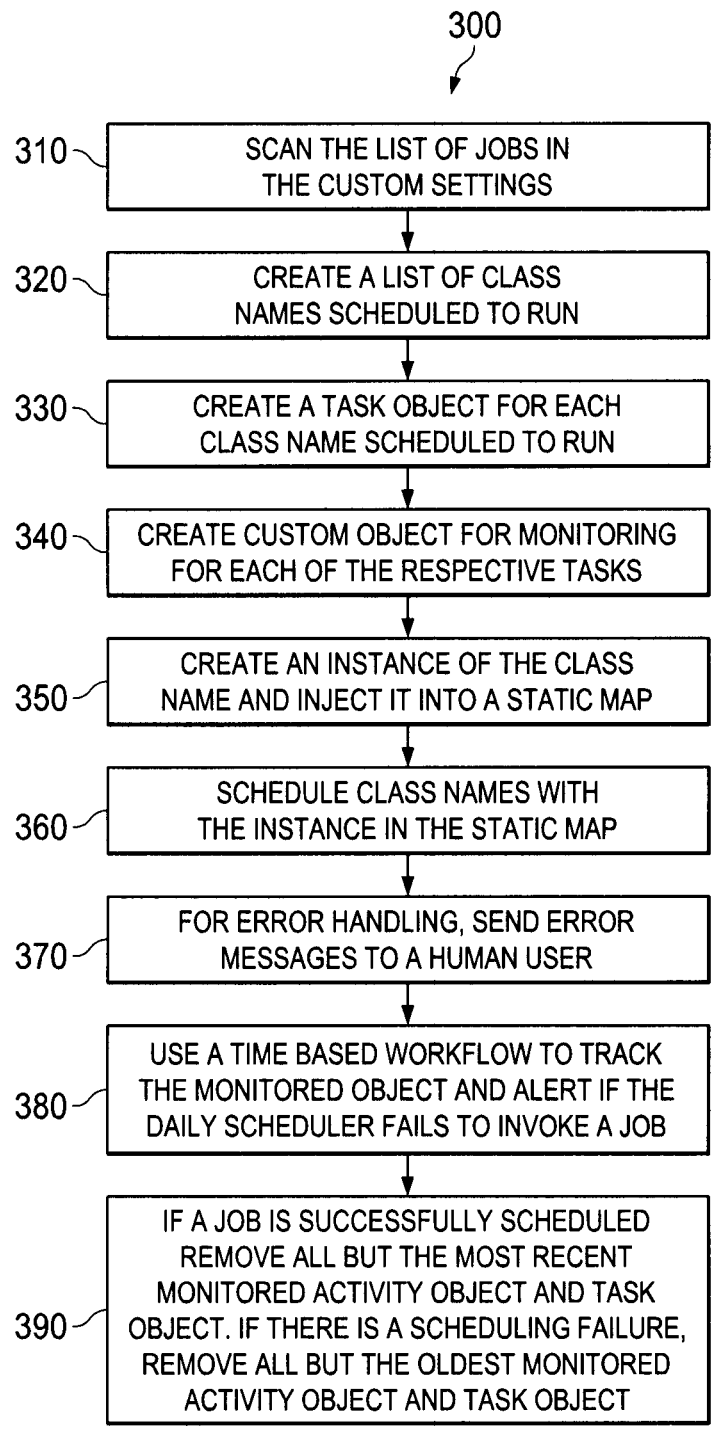
FIG. 3 is an illustration of an example process, adapted according to one embodiment.

The scope of embodiments includes any appropriate technique to access and schedule the additional jobs. FIG. 3 is an illustration of example method 300, adapted according to one embodiment to schedule processing jobs in a computer system. Method 300 is a particular example that falls within the principles described above with respect to method 200. As with method 200, method 300 may be performed by one or more processor-based devices executing computer code.

The following example is directed to the use of the Apex programming language, but it is understood that the scope of embodiments includes programs written using any appropriate programming language. For instance, Java is a programming language that is similar in many respects to Apex, and the operations described below could also be implemented with analogous methods and classes in Java. In fact, any other appropriate object-oriented programming language may be used.

Within the context of Apex, method 300 includes making a single "Schedulable" class that invokes many Database-.Batchable jobs. This is in contrast to the conventional technique using one job per Schedulable class. The following example provides a way to accommodate different jobs that should be invoked at different times and at different frequencies without hard coding the list of the jobs that can run.

Method 300 assumes that the software program running on the computer system has a first list that includes a multitude of class names, where each of the class names corresponds to a job to be run. In one example, the first list includes a Custom Settings object that allows a programmer to specify class names, time ranges, and other information for each of the jobs. In one embodiment, each entry in the Custom Settings object includes the fields shown in Table 1 (below), as a programmer may set the values in the fields as desired.

TABLE 1

| Field Name | Description | Example Value |
| --- | --- | --- |
| Hour__c | The hour of the day in which the job should be invoked. Allowed values are a number 0 through 23, a range like 6-12, comma separated values or ranges, or "*" which is equivalent to 0-23. A "—" may be used to indicate the job should not run. | 0, 1, 2, 12-14 |
| Minute__c | The minute ranges in which the job should be invoked. Like Hour__c, this filed can be set to a list of range and values, "*" means every time Daily Scheduler runs, "—" means never. | 0, 6, 30-45 |
| OwnerId__c | A user Id of the user who will own the task, and be alerted should the job not run | 00560000000mStZ |
| Priority__c | This is the relative ranking of a given job's priority. Should multiple jobs be scheduled for the same time, the job with the lowest numerical priority value is started first. If the system is currently running a maximum number of jobs concurrently, and there are still jobs left to scheduled, those jobs with a higher numerical priority value are not scheduled. | 23 |
| Scope__c | This is the number of records sent to each individual batch execution, provided a batchable job returns a QueryLocator. Values from 1 to 2000 are supported. | 200 |

In action 310, the DailyScheduler (or other job scheduling functionality) scans the list of jobs in the Custom Settings object. For instance, the DailyScheduler occupies at least one of the available job slots in the program. When Daily-Scheduler is invoked, it is programmed to go the Custom Settings object and to scan the classes listed in the Custom Settings object.

When the DailyScheduler invokes, it loops through the fields in the entries and finds classes currently scheduled to start. In this example, there is an arbitrary frequency for the DailyScheduler to invoke, e.g., once every five minutes for twelve slots. Consequently, when evaluating if a class corresponds to a job that is scheduled to run, the DailyScheduler evaluates if the class is scheduled to run before the next scheduled time for the DailyScheduler to invoke. For example, if there was a frequency of once every seven minutes for the DailyScheduler, and a particular class was scheduled every twelve minutes, then the job corresponding to the class would be started at 0, 7, 21, 35, and 42 minutes after the hour. Of course another embodiment could use a different technique such as selecting any class scheduled since the last invocation time or selecting those classes scheduled closest to the current invocation time.

In action 320, the DailyScheduler creates a list of class names scheduled to run. For instance, as mentioned above, if a class is scheduled to run before the next invocation of the DailyScheduler, then the DailyScheduler puts that class in the list of names.

In action 330, the DailyScheduler creates a task object for each of the class names scheduled to run. In some embodiments, the task object is a standard Apex object that is entered into a user's calendar. Thus, action 330 may include appending a meaningful subject name to the task object so that the object makes sense to a human user. It should be noted that a given class may be run multiple times in a day, and to avoid accumulating multiple task objects for the same class after each time the class is run, the system may delete previously-created task objects for a given class each time the class is run. This is explained more fully below with respect to action 390.

Still further in this example, the task object may be dated with a date in the future, e.g., 24 hours in the future. When a task object is created with a date of 24 hours in the future, a user can track whether the job that corresponds to the class name and task object has been run. For instance, if the task is overdue, then the user can infer that the task has not been run during the previous day. In other words, one advantage associated with creating task objects for each class is that the task objects provide a useful way for a human end-user to track whether jobs are actually being executed.

In action 340, for each task created, a trigger of the task creates a custom object for monitoring the class. For instance, in Apex, the object MonitoredActivity_c can be used to reflect information about a particular class that corresponds to a particular task. Each monitored object may then be associated with a time-based workflow, where a time-based workflow includes an action (e.g., check status of class) paired with a condition based on time (e.g., perform the action every hour). Thus, the monitored object may be used to check the status of the class at desired times, which may server as the basis of error alerts, as explained in more detail below with respect to action 380.

In action 350, the system creates an instance of the class. In this example, action 350 includes creating an instance of the batchable object (Database.Batchable<Object>). In some programming languages reflection may be used to create the class instances. However, in this particular example, Apex does not support reflection for classes. One approach within Apex includes using a batchable factory class to create objects based on names. However, when using a factory class, some systems will lock any referenced classes from update when the DailyScheduler is actively scheduled—this is to ensure that class instances are not updated as they are being invoked.

A second approach includes injecting the class instance from the trigger of another object. When the object's triggers fire, the triggers in turn create an instance of the class and add it to a list such as a static map, where the static map is a second list object that is different from the Custom Settings object. Since the objects created by injection are not known until runtime, the system does not have a chance to lock the referenced classes. The static map of objects can then be used for scheduling, as explained in more detail with respect to action 360.

Embodiments that use injection may employ the triggers of any appropriate object. For instance, in some embodiments the task objects have triggers and are used to create instances of their corresponding classes. In other embodiments, triggers of the monitoring objects are used to create instances of their corresponding classes. An example trigger in Apex can be as short as three lines. In one example the job is named "Foo", and the actual class name is Foo_c. In that case, the trigger at a task object or a monitoring object may include the following code:

```
trigger MA_Foo on MonitoredActivity___c (after insert) {
DailyScheduler.injectBatchable(Trigger.new,'Foo',new Foo___c( ));
}
```

In action 360, the DailyScheduler schedules the class names with the instances in the second list (e.g., the static map). In one example, the class names are associated with priorities, as shown above with respect to Table 1. A general rule is that the numerical priority values indicate which of the jobs corresponding to the class names should be scheduled first and which should be scheduled later. Thus, action 360 may include the DailyScheduler scanning the priority values of the class names in the second list and then scheduling the corresponding jobs according to those priority values.

In some instances, there may be more jobs to schedule than there are available processing resources to handle jobs concurrently. In one example, the platform running on the computer system may limit a number of concurrent processing jobs to a specific integer number, such as five. If there are five processing jobs running concurrently and more jobs that are waiting to be scheduled, the scheduler may simply refuse to schedule further jobs until the next time the scheduler is invoked. Additionally or alternatively the scheduler may schedule some but not all of the jobs with the expectation that there should be available computing resources the next time the scheduler is invoked. Also, in an instance when a job corresponding to a particular class is still running, the DailyScheduler may not schedule that particular job again until the currently-running job completes. The scope of embodiments is not limited to any particular technique for assigning priority to jobs and then either scheduling or not scheduling jobs as processing resources permit, as any appropriate scheduling technique may be used.

In action 370, the platform sends error messages to a human user when errors occur. For instance, when the DailyScheduler fails to schedule a job, it may send a message (e.g., email, text message, etc.) to the end-user to whom the job is assigned. Also, when a task object is overdue, the system may further provide an indication to a user by a message. Furthermore, messages may be sent to IT professionals in addition to or instead of the assigned end-users. Any technique to provide error messages is within the scope of embodiments.

Similarly, action 380 includes using a time-based workflow to track the monitored object and provide an alert if a job is not invoked. For instance, a time-based workflow may be set to scan monitoring objects and/or task objects and then send alerts when a corresponding job does not execute.

Actions 370 and 380 illustrate that various embodiments use the task objects and monitoring objects to inform end users and IT professionals about errors automatically. Some embodiments may provide a level of error alert automation to reduce or eliminate the conventional practice of an administrator logging in and checking job status manually.

In action 390, the DailyScheduler removes previously instantiated monitoring objects and tasks for a given job when the class for that job is either scheduled or a scheduling attempt is failed. For instance, if a job is successfully scheduled, the DailyScheduler removes all but the most recent monitored activity object and task object for the class. Similarly, if there is a scheduling failure, the DailyScheduler removes all but the oldest monitored activity object and task object for the class. In either event, action 390 prevents the buildup of old monitoring objects and task objects, and a time stamp on a task object or a monitoring object can serve as an indication of when (or if) a job has run.

The scope of embodiments is not limited to the particular flow shown in FIG. 3. Rather, other embodiments may add, omit, rearrange, or modify one or more actions in accordance with a given design. For instance, some embodiments may repeat process 300 each time a DailyScheduler is invoked.

Furthermore, while the discussions of FIGS. 2 and 3 refer to a DailyScheduler in Apex, the scope of the disclosure is not so limited. Rather, for a given platform, one or more job functions that are operable to scan a list of classes and invoke other jobs may be used.

Moreover, some embodiments include the actions of programmers to select an appropriate frequency for each one of the jobs to be run. Some jobs benefit from running frequently, in that they accumulate more work over time so it is a small task to run every few minutes but a large task to run once a week. Also, as a general rule, a job should not be scheduled so frequently that it cannot complete before its next scheduled time. Thus, if a job is expected to take fifteen minutes maximum to execute, a programmer may choose to schedule that job to run no more than once every twenty minutes or so. If a job benefits from processing once a day, then a programmer may choose to schedule the job once a day or twice to be cautious. A programmer may use such considerations (and any other appropriate considerations) to set frequencies for jobs to run and priorities for those jobs when assigning values to the fields in Table 1.

Various embodiments may include one or more advantages over conventional systems. For instance, the embodiments described above use a limited number of defined job slots to access an arbitrarily large set of jobs to be scheduled. As explained above, various embodiments provide access to the large set of jobs by using one or more jobs (e.g., a DailyScheduler) in the slots to access a list of additional jobs to be scheduled and invoked. The list of additional jobs is not associated with, nor limited by, the number of slots. Such embodiments may provide a way to bypass a limitation of a software platform and implement a desired amount of functionality.

Various embodiments may also provide timely alerts, as described above. By contrast, a conventional system may rely on an end-user noticing stale or outdated data to provide an indication that a particular job is not executing correctly. Furthermore, other conventional systems may rely on administrators to manually log into a system to check on the status of various jobs. Various embodiments may provide a degree of automation for error alerts so as to keep end users and administrators apprised of errors in good time.

When implemented via computer-executable instructions, various elements of embodiments of the present disclosure are in essence the software code defining the operations of such various elements. The executable instructions or software code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

Figure 4:
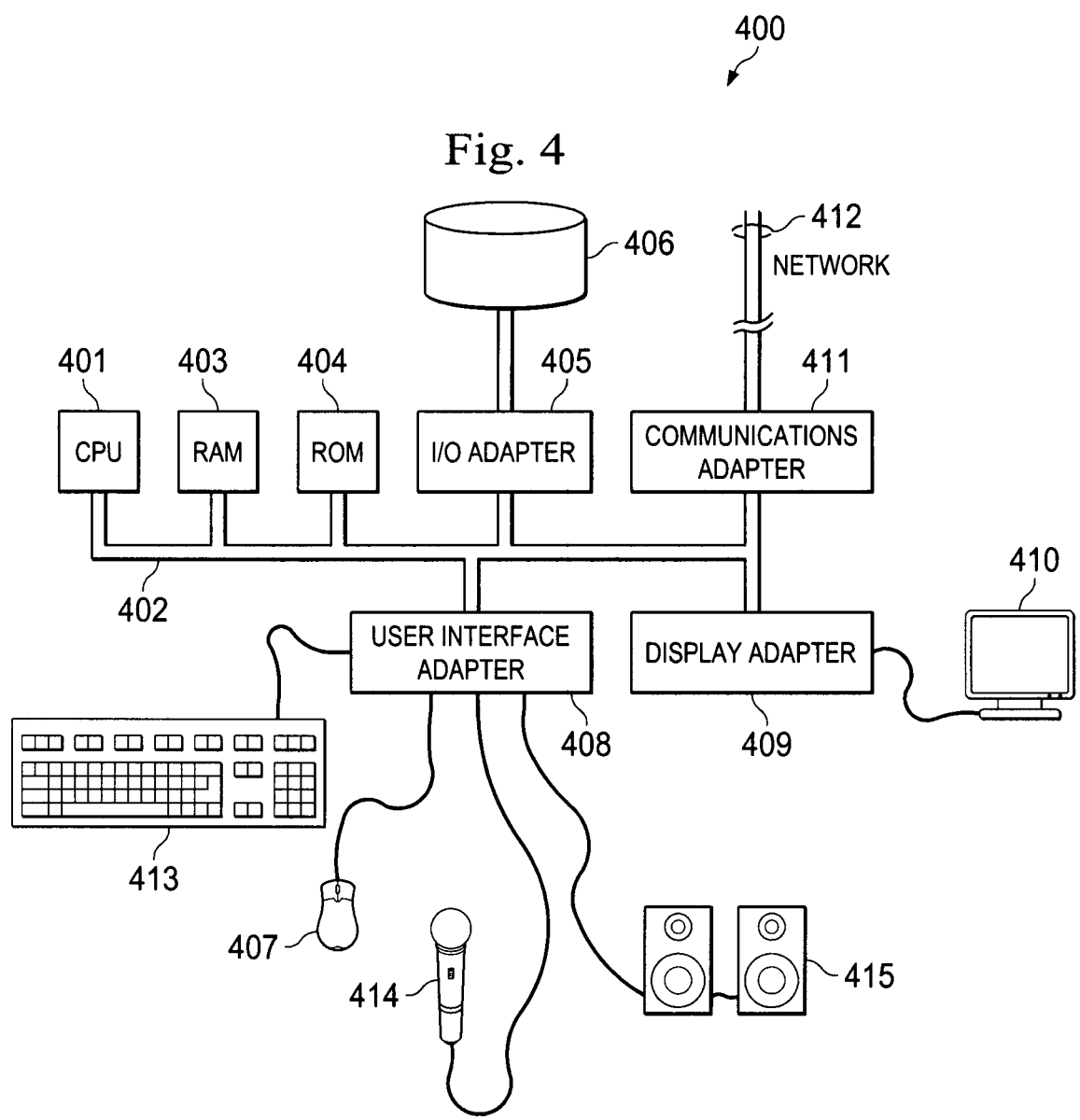
FIG. 4 is an illustration of an example computer system adapted according to one embodiment of the present disclosure.

FIG. 4 illustrates an example computer system 400 adapted according to one embodiment of the present disclosure. That is, computer system 400 comprises an example system on which embodiments of the present disclosure may be implemented (such as a processor-based device running a program that has processing jobs). For instance, computer system 400 provides a general architectural illustration of a server at a cloud-based resource, a server on a company's intranet, a computer for use by an end user or IT professional, and/or the like. The scope of embodiments is not limited to any particular type of computer, as long as that computer is operable to run software that has scheduled processing jobs.

Central processing unit (CPU) 401 is coupled to system bus 402. CPU 401 may be any general purpose or specialized purpose CPU. However, the present disclosure is not restricted by the architecture of CPU 401 as long as CPU 401 supports the inventive operations as described herein. CPU 401 may execute the various logical instructions according to embodiments of the present disclosure. For example, one or more CPUs, such as CPU 401, may execute machine-level instructions according to the exemplary operational flows described above in conjunction with FIGS. 2 and 3.

Computer system 400 also preferably includes random access memory (RAM) 403, which may be SRAM, DRAM, SDRAM, or the like. Computer system 400 preferably includes read-only memory (ROM) 404 which may be PROM, EPROM, EEPROM, or the like. RAM 403 and ROM 404 hold user and system data and programs.

Computer system 400 also preferably includes input/output (I/O) adapter 405, communications adapter 411, user interface adapter 408, and display adapter 409. I/O adapter 405, user interface adapter 408, and/or communications adapter 411 may, in certain embodiments, enable a user to interact with computer system 400 in order to input information, such as programming a frequency or priority of a job.

I/O adapter 405 preferably connects to storage device(s) 406, such as one or more of hard drive, compact disc (CD) drive, solid state drive, etc. to computer system 400. The storage devices may be utilized when system memory RAM 403 is insufficient for the memory requirements associated with storing media data. Communications adapter 411 is preferably adapted to couple computer system 400 to communication link 412 (e.g., the Internet, a LAN, a cellular network, etc.). User interface adapter 408 couples user input devices, such as keyboard 413, pointing device 407, and microphone 414 and/or output devices, such as speaker(s) 415 to computer system 400. Display adapter 409 is driven by CPU 401 to control the display on display device 410 to, for example, display a calendar with task objects or an alert message to a human user at a client.

While FIG. 4 shows a general-purpose computer, it should be noted that the exact configuration of a portion of a system according to various embodiments may be slightly different. For example, a given processor-based device in one or more examples may be implemented as any suitable computer, such as a laptop computer, a tablet computer, a server computer, a smartphone, and/or the like.

In accordance with embodiments of the present disclosure, computer system 400 performs specific operations by CPU 401 executing one or more sequences of one or more instructions contained in system memory component 403. Such instructions may be read into system memory component 403 from another computer readable medium, such as ROM 404 or drive 406. In other embodiments, hard-wired circuitry may be used in place of (or in combination with) software instructions to implement the present disclosure.

Logic may be encoded in a computer readable, non-transitory medium. Such a medium may take many forms, including but not limited to, non-volatile media and volatile media. In various implementations, non-volatile media includes optical or magnetic disks, such as disk or solid-state drive component 406, and volatile media includes dynamic memory, such as system memory component 403. CPU 401 reads application code from the readable medium and executes the code to provide the described functionality.

In various embodiments of the present disclosure, execution of instruction sequences to practice the present disclosure may be performed by computer system 400. In various other embodiments of the present disclosure, a plurality of computer systems (not shown) coupled by communication link 412 (e.g., a communications network, such as a LAN, WLAN, PTSN, and/or various other wired or wireless networks, including telecommunications, mobile, and cellular phone networks) may perform instruction sequences to practice the present disclosure in coordination with one another.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   in a program that includes a defined number of job slots for data updating processing jobs, scheduling a first job in one of the slots;
   executing the first job, wherein the first job includes logic for scanning a list of additional jobs scheduled to run before a subsequent iteration of the first job and scheduling those additional jobs for execution, further wherein a total number of the additional jobs in the program exceeds the defined number of job slots, and wherein the list of additional jobs includes a custom settings object that defines a class name, an owner identification corresponding to a user who receives an alert for each job within the list of additional jobs, and time range for each job within the list of additional jobs, and wherein the alert for each job indicates if the corresponding job is not invoked; and
   creating a monitoring object for each of the additional jobs, wherein each monitoring object is associated with a time-based workflow, wherein the time-based workflow includes an action that is paired with a condition.

2. The method of claim 1 in which the list of additional jobs comprises a list object including a plurality of class names, each of the class names corresponding to a respective one of the additional jobs.

3. The method of claim 1 in which scheduling the additional jobs for execution comprises:
   using injection to create a plurality of instances of class names, each of the class names corresponding to a respective one of the additional jobs; and
   using a scheduling function to schedule the instances of the class names.

4. The method of claim 3 in which each of the class names is associated with a respective priority value; further in which scheduling the instances of the class names includes taking account of respective priority values of the class names.

5. The method of claim 3 in which the program includes a limit on a number of jobs that may be run concurrently; further in which scheduling the instances of the class names includes taking account of the limit in the number of jobs that may be run concurrently.

6. The method of claim 1 further comprising:
   for each of the additional jobs, creating a task object to indicate errors in scheduling and invoking.

7. The method of claim 6 further comprising:
   sending an alert message in response to the time-based workflow that scans the monitoring object corresponding to one of the additional jobs.

8. The method of claim 6 in which the task object is created with a due date in the future, and an overdue status of the task object indicates a failure of a corresponding one of the additional jobs to invoke.

9. A system comprising:
   one or more server computers serving one or more end-user computers, the server computers running a program that provides data updating jobs and has a limited number of available slots for a set of scheduled data updating jobs, the server further executing code to provide:
      job scheduling logic of a job within one or more of the slots, the job scheduling logic accessing a list of additional jobs scheduled to run before a subsequent iteration of the job, the additional jobs not associated with the slots, instantiating objects associated with the additional jobs, and scheduling the additional jobs in accordance with respective frequency and priority values of each of the additional jobs, a number of additional jobs exceeding the limited number of available slots, and wherein the list of additional jobs includes a custom settings object that defines a class name, an owner identification corresponding to a user who receives an alert for each job within the list of additional jobs, and time range for each job within the list of additional jobs, and wherein the alert for each job indicates if the corresponding job is not invoked; and
      the job scheduling logic creating a monitoring object for each of the additional jobs, wherein each monitoring object is associated with a time-based workflow, wherein the time-based workflow includes an action that is paired with a condition.

10. The system of claim 9, wherein the job scheduling logic uses the monitoring objects to generate one or more error messages.

11. The system of claim 9 in which the scheduling logic uses triggers associated with the instantiated objects to inject class names associated with the additional jobs into a list object for scheduling.

12. A computer program product having a non-transitory computer readable medium tangibly recording computer program logic for updating data in a computer system, the program logic including a defined number of data processing job slots, the computer program product comprising:
   code to schedule a first job in one of the slots, the first job including a scheduling function that scans a first list for class names scheduled to run before a subsequent iteration of the first job is scheduled to run, and wherein the first list includes a custom settings object that defines a class name, an owner identification corresponding to a user who receives an alert for each job within the first list, and a time range for each job within the first list, and wherein the alert for each job indicates if the corresponding job is not invoked;
   code to select ones of the class names scheduled to run based on the scanning;
   code to create a plurality of task objects, at least one task object for each selected class name;
   code to use triggers to create a monitoring object for a respective class name for each of the task objects, wherein each monitoring object is associated with a time-based workflow, wherein the time-based workflow includes an action that is paired with a condition;
   code to create a plurality of instances, at least one instance for each of the selected class names, and to inject the instances into a second list; and
   code to schedule additional jobs by the scheduling function, each of the additional jobs corresponding to a respective one of the instances in the second list.

13. The computer program product of claim 12 in which the code to create a plurality of instances comprises code to use triggers of the monitoring objects to create the instances.

14. The computer program product of claim 12 further comprising:
   code to monitor the additional jobs using the monitoring objects.

15. The computer program product of claim 12 further comprising:
   code to invoke each of the additional jobs in the order in which the additional jobs are scheduled.

16. The computer program product of claim 12 further comprising:
   code to invoke the first job repeatedly according to a schedule.

17. The computer program product of claim 12 further comprising:
   code to use one of the monitoring objects to send an alert when a corresponding, respective one of the additional jobs fails to execute.

18. The computer program product of claim 17 in which the alert comprises an email to an administrator.

19. The computer program product of claim 12 further comprising:
   code to remove a previously-created monitored object associated with one of the additional jobs and a task associated with the one of the additional jobs in response to successfully scheduling the one of the additional jobs.

20. The computer program product of claim 12 further comprising:
   code to remove a previously-created monitored object associated with one of the instances and a task associated with the one of the instances in response to a failure to schedule the one of the instances as a job.

* * * * *